(12) United States Patent
Chu

(10) Patent No.: US 7,449,938 B2
(45) Date of Patent: Nov. 11, 2008

(54) APPARATUS AND METHOD FOR GENERATING INTERNAL VOLTAGE IN SEMICONDUCTOR INTEGRATED CIRCUIT

(75) Inventor: Gyo-Soo Chu, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 0 days.

(21) Appl. No.: 11/826,913

(22) Filed: Jul. 19, 2007

(65) Prior Publication Data
US 2008/0150618 A1    Jun. 26, 2008

(30) Foreign Application Priority Data
Dec. 22, 2006    (KR) .................. 10-2006-0132540

(51) Int. Cl.
*G05F 1/10* (2006.01)
(52) U.S. Cl. ...................................... 327/536
(58) Field of Classification Search .......... 327/512, 327/513, 535, 536, 537
See application file for complete search history.

(56) References Cited

U.S. PATENT DOCUMENTS

| 6,079,023 A | 6/2000 | Yoon et al. |
| 6,778,460 B1 | 8/2004 | Jung |
| 6,891,773 B2 | 5/2005 | Park |
| 7,091,769 B2 * | 8/2006 | Kwon et al. ............... 327/535 |
| 7,173,480 B2 | 2/2007 | Kim et al. |
| 2007/0025163 A1 | 2/2007 | Partsch et al. |

FOREIGN PATENT DOCUMENTS

| JP | 11203876 | 7/1999 |
| KR | 10-0353543 | 9/2002 |
| KR | 1020050041592 | 5/2005 |

* cited by examiner

*Primary Examiner*—Jeffrey S Zweizig
(74) *Attorney, Agent, or Firm*—Venable LLP; Jeffri A. Kaminski

(57) ABSTRACT

An internal voltage generating apparatus includes: a voltage detector that detects the level of the internal voltage and outputs a fixed level detection signal and a variable level detection signal. An oscillation controller generates an oscillation enable signal according to whether the fixed level detection signal and the variable level detection signal are enabled. An internal voltage generator generates the internal voltage in response to the oscillation enable signal.

25 Claims, 4 Drawing Sheets

[FIG. 1]
PRIOR ART
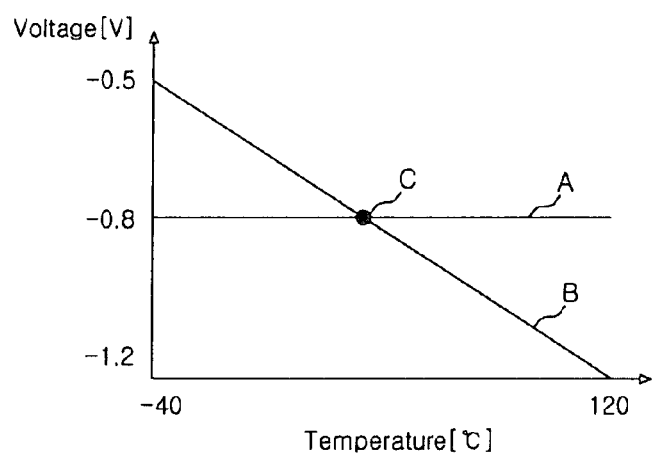
[FIG. 2]
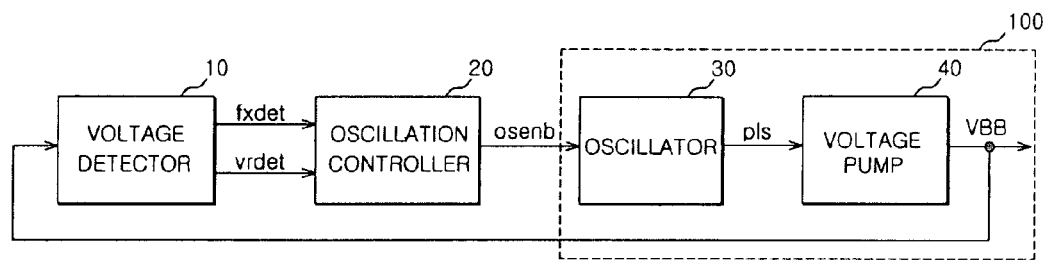

[FIG. 3]
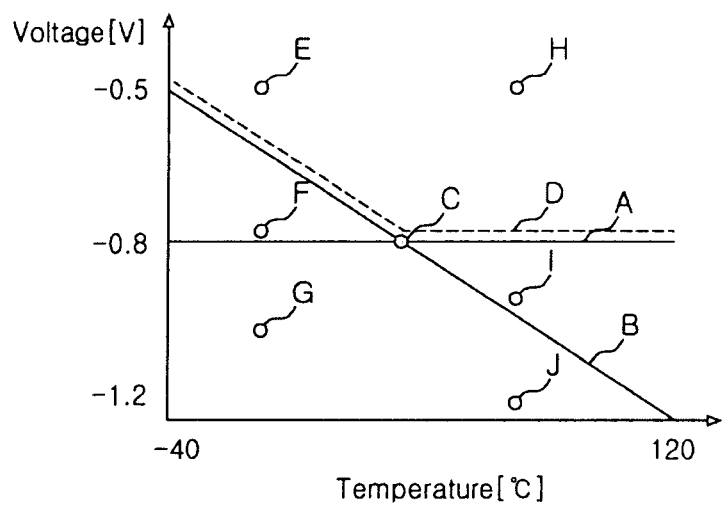
[FIG. 4]
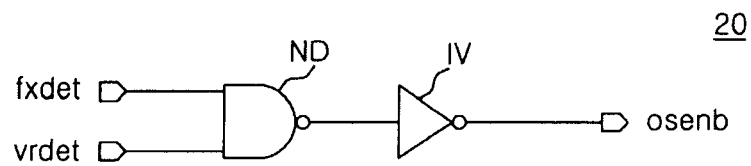
[FIG. 5]
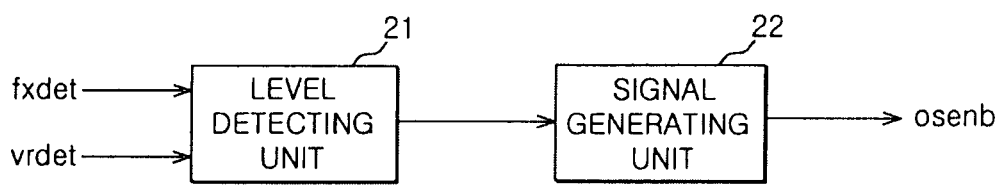

[FIG. 6]
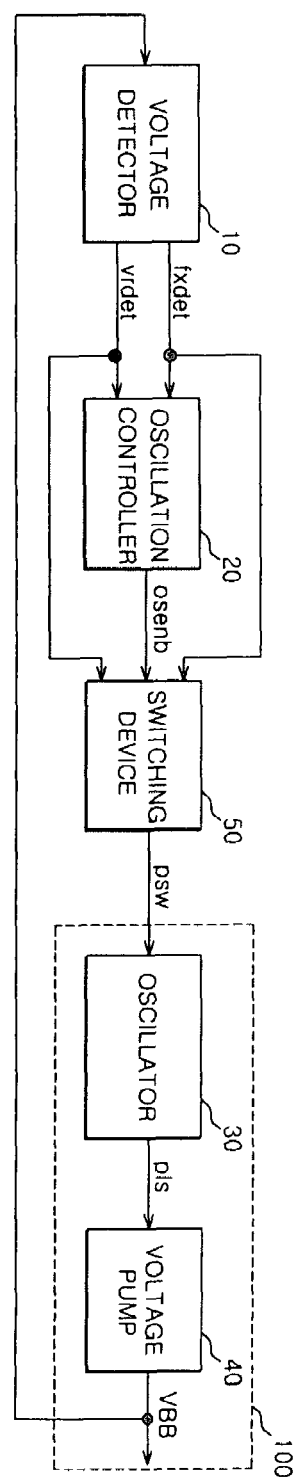

[FIG. 7]
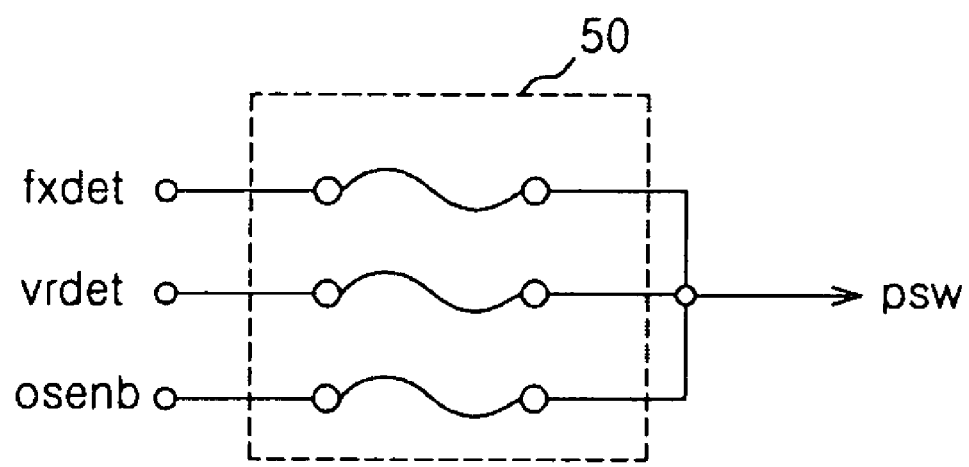

APPARATUS AND METHOD FOR GENERATING INTERNAL VOLTAGE IN SEMICONDUCTOR INTEGRATED CIRCUIT

CROSS-REFERENCE TO RELATED PATENT APPLICATION

This application claims the benefit of Korean Patent Application No. 10-2006-0132540, filed on Dec. 22, 2006, in the Korean Intellectual Property Office, the disclosure of which is incorporated herein in its entirety by reference.

BACKGROUND OF THE INVENTION

1. Technical Field

The present invention relates to a semiconductor integrated circuit, and more particularly, to an apparatus and method for generating an internal voltage.

2. Related Art

In general, semiconductor integrated circuits are supplied with an external power supply voltage VDD and a ground voltage VSS from an external device and generate internal voltages such as a high-level voltage VPP and a bulk voltage VBB. The semiconductor integrated circuit detects whether the current internal voltage is higher than a target level. When the internal voltage is lower than the target level, the semiconductor integrated circuit pumps up the internal voltage and keeps the internal voltage at the target level.

A general internal voltage generating apparatus generates an internal voltage according to an output signal of a voltage detector that detects the target level.

The voltage detector includes a normal detecting unit that outputs a fixed level detection signal and a modulating unit that outputs a variable level detection signal, and uses a fuse circuit to selectively output the fixed level detection signal and the variable level detection signal. The fixed level detection signal indicates whether the internal voltage reaches a fixed reference level regardless of a variation in temperature, and the variable level detection signal indicates whether the internal voltage reaches a variable reference level according to the variation in temperature.

Next, the operation of the internal voltage generating apparatus according to the related art will be described below with reference to FIG. 1.

FIG. 1 is a graph illustrating the operation of an internal voltage generating apparatus of a semiconductor integrated circuit according to the related art, and the bulk voltage VBB is used as the internal voltage.

In the graph, a solid line A indicates the target level of a bulk voltage of a normal detecting unit that varies according to the temperature, and a solid line B indicates the target level of a bulk voltage of a modulating unit that varies according to the temperature.

As can be seen from the graph shown in FIG. 1, the normal detecting unit determines whether the bulk voltage is higher than −0.8 V regardless of the variation in temperature. When the bulk voltage is higher than −0.8 V (when the absolute value is smaller than 0.8 V), a fixed level detection signal output from the normal detecting unit is enabled, so that the internal voltage is generated.

However, as the temperature increases, the modulating unit lowers the target level of the bulk voltage and detects the target level. As shown in FIG. 1, when the semiconductor integrated circuit is under the condition of −40° C., the modulating unit determines whether the bulk voltage is higher than −0.5 V. When the semiconductor integrated circuit is under the condition of 120° C., the modulating unit determines whether the bulk voltage is higher than −1.2 V.

When the normal detecting unit sets a fixed voltage level to generate a bulk voltage regardless of the variation in temperature, it is difficult to cope with the variation in the characteristics of transistors provided in the semiconductor integrated circuit. In the semiconductor integrated circuit, since the threshold voltage of a cell transistor increases when it is at a low temperature, it is necessary to increase a bulk voltage level (to decrease an absolute value) to compensate for the increase in the threshold voltage. However, it is difficult to realize such a technique by detecting only the fixed level.

When a variable level is set according to a variation in temperature to generate a bulk voltage, it is possible to compensate for the threshold voltage of the cell transistor in a low temperature environment, as described above. However, when the target level of the cell transistor is lowered in a high temperature environment (when the absolute value increases), an increment in the threshold voltage of the cell transistor due to the bulk voltage that is decreased (the absolute value that is increased) by an internal voltage generating circuit is larger than a decrease in the threshold voltage of the cell transistor due to an increase in temperature, which makes it difficult to input/output data.

Therefore, preferably, a variable target level should be set to follow the solid line B in a low temperature environment and a fixed target level should be set to follow the solid line A in a high temperature environment, on the basis of a point C, which is an intersection of the solid line A and the solid line B. However, this technique has not been used in the related art, and as a result, it is difficult to generate an effective bulk voltage. Therefore, it is necessary to realize a technique for efficiently setting the target levels of other internal voltages in addition to the bulk voltage.

SUMMARY OF THE INVENTION

An embodiment of the present invention provide an apparatus and method for generating an internal voltage in a semiconductor integrated circuit by selectively applying the target level of an internal voltage set by a normal detecting unit and the target level of an internal voltage set by a modulating unit according to the temperature conditions.

Another embodiment of the present invention provides an apparatus and method for generating an internal voltage in a semiconductor integrated circuit capable of adjusting the target level of an internal voltage to prevent erroneous operations due to a variation in the characteristics of transistors that occurs according to the temperature conditions.

According to an embodiment of the present invention, an apparatus for generating an internal voltage in a semiconductor integrated circuit includes: a voltage detector that detects the level of the internal voltage and outputs a fixed level detection signal and a variable level detection signal; an oscillation controller that generates an oscillation enable signal according to whether the fixed level detection signal and the variable level detection signal are enabled; and an internal voltage generator that generates the internal voltage in response to the oscillation enable signal.

According to another embodiment of the present invention, an apparatus for generating an internal voltage in a semiconductor integrated circuit includes: a voltage detector that detects the level of the internal voltage and outputs a fixed level detection signal and a variable level detection signal; an oscillation controller that generates an oscillation enable signal according to whether the fixed level detection signal and the variable level detection signal are enabled; a switching device that selects any one of the fixed level detection signal, the variable level detection signal, and the oscillation enable signal, and outputs the selected signal; an oscillator that generates a pulse signal in response to an output signal of the switching device; and a voltage pump that performs a pumping operation in response to the pulse signal to generate the internal voltage.

According to still another embodiment of the present invention, there is provided a method of generating an internal voltage in a semiconductor integrated circuit. The method includes: detecting the level of the internal voltage and outputting a fixed level detection signal and a variable level detection signal; generating an oscillation enable signal according to whether the fixed level detection signal and the variable level detection signal are enabled; and generating the internal voltage in response to the oscillation enable signal.

BRIEF DESCRIPTION OF THE DRAWINGS

FIG. 1 is a graph illustrating the operation of an internal voltage generating apparatus of a semiconductor integrated circuit according to the related art.

FIG. 2 is a block diagram illustrating an internal voltage generating apparatus of a semiconductor integrated circuit according to an embodiment of the invention.

FIG. 3 is a graph illustrating the operation of the internal voltage generating apparatus shown in FIG. 2.

FIG. 4 is a detailed circuit diagram illustrating an example of an oscillation controller shown in FIG. 2.

FIG. 5 is a block diagram illustrating another example of the oscillation controller shown in FIG. 2.

FIG. 6 is a block diagram illustrating an internal voltage generating apparatus of a semiconductor integrated circuit according to another embodiment of the invention.

FIG. 7 is a block diagram illustrating an example of a switching device shown in FIG. 6.

DESCRIPTION OF EXEMPLARY EMBODIMENT

Embodiments of the present invention will now be described in detail with reference to the accompanying drawings.

The internal voltage generator shown in FIG. 2 includes a voltage detector 10, an oscillation controller 20, and an internal voltage generator 100.

The voltage detector 10 detects the level of a bulk voltage VBB and outputs a fixed level detection signal fxdet and a variable level detection signal vrdet.

The voltage detector 10 includes a normal detecting unit for generating the fixed level detection signal fxdet and a modulating unit for generating the variable level detection signal vrdet.

The fixed level detection signal fxdet indicates whether an internal voltage reaches a predetermined reference level regardless of a variation in temperature, and the variable level detection signal vrdet indicates whether the internal voltage reaches a variable reference level according to the variation in temperature.

The fixed level detection signal fxdet and the variable level detection signal vrdet indicate different reference levels accounting for a specific temperature of the semiconductor integrated circuit.

The oscillation controller 20 generates an oscillation enable signal osenb according to whether the fixed level detection signal fxdet and the variable level detection signal vrdet are enabled.

The oscillation controller 20 shown in FIG. 5 includes a level detecting unit 21 that receives the fixed level detection signal fxdet and the variable level detection signal vrdet and sets a higher level (having a smaller absolute value) of the levels detected by the normal detecting unit and the modulating unit as a reference level and a signal generating unit 22 that generates the oscillation enable signal osenb according to whether the internal voltage reaches the reference level.

The oscillation controller 20 outputs the oscillation enable signal osenb that is disabled when at least one of the fixed level detection signal fxdet and the variable level detection signal vrdet is disabled.

The internal voltage generator 100 generates the bulk voltage VBB in response to the oscillation enable signal osenb.

The internal voltage generator 100 includes an oscillator 30 and a voltage pump 40.

The oscillator 30 generates a pulse signal pls in response to the oscillation enable signal osenb. The oscillator 30 performs an oscillation to generate the pulse signal pls when the oscillation enable signal osenb is enabled.

The pulse signal pls output from the oscillator 30 is toggled when the oscillation enable signal osenb is enabled.

The voltage pump 40 performs a pumping operation in response to the pulse signal pls to generate the bulk voltage VBB.

When the pulse signal pls is toggled, the voltage pump 40 pumps down the level of the bulk voltage VBB (increases the absolute value).

The target level of the internal voltage generated by the internal voltage generator according to an embodiment of the invention depends on the setting of the voltage detector, and the operation period of the voltage pump is determined by the target level, so that the internal voltage reaches the target level.

FIG. 3 is a graph illustrating the operation of the internal voltage generator shown in FIG. 2.

In the graph shown in FIG. 3, a horizontal axis indicates temperature, and a vertical axis indicates a voltage level. A solid line A indicates the target level of the bulk voltage VBB set by the normal detecting unit, and a solid line B indicates the target level of the bulk voltage VBB set by the modulating unit. An intersection of the solid line A and the solid line B is represented by a point C. A dotted line D indicates the target level of the bulk voltage VBB set by the oscillation controller 20. As shown in FIG. 3 (the dotted line D), the internal voltage generator according to this embodiment sets a higher level (having a smaller absolute value) of the levels set by the normal detecting unit and the modulating unit as a reference level of the oscillation controller 20. This is as follows. The internal voltage generator generates the bulk voltage VBB corresponding to the target level of the modulating unit at a temperature lower than the intersection C to lower a threshold voltage of a cell transistor. When the temperature increases, the internal voltage generator increases the threshold voltage of the cell transistor and adjusts the threshold voltage so it does not excessively increase at a temperature equal to or higher than the intersection C, thereby generating the bulk voltage VBB having a level capable of effectively operating the semiconductor integrated circuit.

When the voltage and temperature of the semiconductor integrated circuit reach a point E, the fixed level detection signal fxdet and the variable level detection signal vrdet are enabled, and the oscillation enable signal osenb is also enabled. When the voltage and temperature of the semiconductor integrated circuit reach a point F, the fixed level detection signal fxdet is enabled, and the variable level detection signal vrdet and the oscillation enable signal osenb are disabled. When the voltage and temperature of the semiconductor integrated circuit reach a point G, the fixed level detection signal fxdet and the variable level detection signal vrdet are disabled, and the oscillation enable signal osenb is also disabled.

When the voltage and temperature of the semiconductor integrated circuit reach a point H, the fixed level detection signal fxdet and the variable level detection signal vrdet are enabled, and the oscillation enable signal osenb is also enabled. When the voltage and temperature of the semiconductor integrated circuit reach a point I, the fixed level detection signal fxdet is disabled, the variable level detection signal vrdet is enabled, and the oscillation enable signal osenb is disabled. When the voltage and temperature of the semiconductor integrated circuit reach a point J, the fixed level detection signal fxdet and the variable level detection signal vrdet are disabled, and the oscillation enable signal osenb is also disabled.

FIG. 4 is a detailed circuit diagram of the oscillation controller 20 shown in FIG. 2.

For example, when both the fixed level detection signal fxdet and the variable level detection signal vrdet are enabled, the oscillation enable signal osenb is enabled.

The oscillation controller 20 may be formed of a combination of a NAND gate ND and an inverter IV. In this embodiment, a logical product of the fixed level detection signal fxdet and the variable level detection signal vrdet is calculated to generate the oscillation enable signal osenb.

FIG. 6 is a block diagram illustrating an internal voltage generator of a semiconductor integrated circuit according to a second embodiment of the invention.

The internal voltage generator according to the second embodiment is similar to the internal voltage generator according to the first embodiment except that it includes a switching device 50 in addition to the voltage detector 10, the oscillation control signal 20, and the internal voltage generator 100.

The switching device 50 receives a fixed level detection signal fxdet and a variable level detection signal vrdet and outputs one of the fixed level detection signal fxdet and the variable level detection signal vrdet. The oscillator 30 generates a pulse signal pls in response to a signal output from the switching device 50.

The switching device 50 may include a fuse circuit such that it outputs a signal selected by the designer, for example, as shown in FIG. 7. Alternatively, a switching element, such as a MOS transistor, may be used as the switching device 50 to output the fixed level detection signal fxdet or the variable level detection signal vrdet in response to a signal stored in a register. However, the switching device 50 is not limited to the above-mentioned circuit and elements.

That is, as in the related art, the designer can control the switching device 50 to select the target level (the solid line A in FIG. 3) of the bulk voltage VBB set by the normal detecting unit or the target level (the solid line B in FIG. 3) of the bulk voltage VBB set by the modulating unit. Alternatively, as in this embodiment, the target level (the dotted line D in FIG. 3) of the bulk voltage VBB set by the oscillation controller 20 can be selected.

As described above, according to the embodiments of the invention, the internal voltage generator of the semiconductor integrated circuit sets a target level that varies according to the temperature at a temperature lower than a predetermined temperature, and sets a fixed target level at a temperature higher than the predetermined temperature to generate a bulk voltage capable of effectively operating the semiconductor integrated circuit.

In the above-described embodiments of the invention, the bulk voltage VBB is used as an internal voltage, but the invention is not limited thereto. In addition, the embodiments of the invention can be applied to techniques for generating an internal voltage by detecting a voltage, generating a pulse, and pumping the voltage.

It will be apparent to those skilled in the art that various modifications and changes may be made without departing from the scope and spirit of the present invention. Therefore, it should be understood that the above embodiments are not limitative, but illustrative in all aspects. The scope of the present invention is defined by the appended claims rather than by the description preceding them, and therefore all changes and modifications that fall within metes and bounds of the claims, or equivalents of such metes and bounds are therefore intended to be embraced by the claims.

What is claimed is:

1. An apparatus for generating an internal voltage in a semiconductor integrated circuit, comprising:
   a voltage detector that detects a level of the internal voltage to output a fixed level detection signal and a variable level detection signal;
   an oscillation controller that generates an oscillation enable signal according to whether the fixed level detection signal and the variable level detection signal are enabled; and
   an internal voltage generator that generates the internal voltage in response to the oscillation enable signal.

2. The internal voltage generating apparatus of claim 1, wherein the voltage detector includes:
   a normal detecting unit that generates the fixed level detection signal indicating whether the internal voltage reaches a fixed reference level regardless of a variation in temperature; and
   a modulating unit that generates the variable level detection signal indicating whether the internal voltage reaches a variable reference level according to the variation in temperature.

3. The internal voltage generating apparatus of claim 2, wherein the oscillation controller includes:
   a level detecting unit that receives the fixed level detection signal and the variable level detection signal and sets a higher level of levels detected by the normal detecting unit and the modulating unit as a reference level; and
   a signal generating unit that generates the oscillation enable signal according to whether the internal voltage reaches the reference level.

4. The internal voltage generating apparatus of claim 2, wherein the oscillation controller disables the oscillation enable signal when at least one of the fixed level detection signal and the variable level detection signal is disabled.

5. The internal voltage generating apparatus of claim 4, wherein the oscillation controller includes:
   a NAND gate that receives the fixed level detection signal and the variable level detection signal to provide an output signal; and
   an inverter that receives the output signal of the NAND gate and outputs the oscillation enable signal.

6. The internal voltage generating apparatus of claim 1, wherein the internal voltage generator includes:
   an oscillator that generates a pulse signal in response to the oscillation enable signal; and
   a voltage pump that performs a pumping operation in response to the pulse signal to generate the internal voltage.

7. The internal voltage generating apparatus of claim 6, wherein the oscillator performs an oscillating operation to generate the pulse signal when the oscillation enable signal is enabled.

8. The internal voltage generating apparatus of claim 7, wherein the oscillator toggles a pulse signal when any one of the fixed level detection signal, the variable level detection signal, or the oscillation enable signal is enabled.

9. The internal voltage generating apparatus of claim 8, wherein the voltage pump pumps up the internal voltage to a target level when the pulse signal is generated.

10. The internal voltage generating apparatus of claim 1, further comprising:
a switching device that selects any one of the fixed level detection signal, the variable level detection signal, or the oscillation enable signal to obtain a selected signal and outputs the selected signal to the internal voltage generating unit.

11. The internal voltage generating apparatus of claim 10, wherein the switching device includes a fuse circuit.

12. The internal voltage generating apparatus of claim 10, wherein the switching device selects any one of the fixed level detection signal, the variable level detection signal, or the oscillation enable signal by cutting of the fuse circuit and outputs the selected signal.

13. An apparatus for generating an internal voltage in a semiconductor integrated circuit, comprising:
a voltage detector that detects a level of the internal voltage and outputs a fixed level detection signal and a variable level detection signal;
an oscillation controller that generates an oscillation enable signal according to whether the fixed level detection signal and the variable level detection signal are enabled;
a switching device that selects any one of the fixed level detection signal, the variable level detection signal, or the oscillation enable signal to obtain a selected signal and outputs the selected signal;
an oscillator that generates a pulse signal in response to the selected signal output of the switching device; and
a voltage pump that performs a pumping operation in response to the pulse signal to generate the internal voltage.

14. The internal voltage generating apparatus of claim 13, wherein the voltage detector includes:
a normal detecting unit that generates the fixed level detection signal indicating whether the internal voltage reaches a fixed reference level regardless of a variation in temperature; and
a modulating unit that generates the variable level detection signal indicating whether the internal voltage reaches a variable reference level according to the variation in temperature.

15. The internal voltage generating apparatus of claim 14, wherein the oscillation controller includes:
a level detecting unit that receives the fixed level detection signal and the variable level detection signal and sets a higher level of levels detected by the normal detecting unit and the modulating unit as a reference level; and
a signal generating unit that generates the oscillation enable signal according to whether the internal voltage reaches the reference level.

16. The internal voltage generating apparatus of claim 14, wherein the oscillation controller disables the oscillation enable signal when at least one of the fixed level detection signal and the variable level detection signal is disabled.

17. The internal voltage generating apparatus of claim 13, wherein the oscillator toggles a pulse signal when any one of the fixed level detection signal, the variable level detection signal, or the oscillation enable signal is enabled.

18. The internal voltage generating apparatus of claim 13, wherein the voltage pump pumps up the internal voltage to a target level when the pulse signal is generated.

19. A method of generating an internal voltage in a semiconductor integrated circuit, comprising:
detecting a level of the internal voltage and outputting a fixed level detection signal and a variable level detection signal based on the levels;
generating an oscillation enable signal according to whether the fixed level detection signal and the variable level detection signal are enabled; and
generating the internal voltage in response to the oscillation enable signal.

20. The method of claim 19, wherein the outputting of the fixed level detection signal and the variable level detection signal includes:
generating the fixed level detection signal indicating whether the internal voltage reaches a fixed reference level regardless of a variation in temperature by using a normal detecting unit; and generating the variable level detection signal indicating whether the internal voltage reaches a variable reference level according to the variation in temperature by using a modulating unit.

21. The method of claim 19, wherein the generating of the oscillation controller includes:
receiving the fixed level detection signal and the variable level detection signal; and setting a higher level of levels detected by the normal detecting unit and the modulating unit as a reference level; and generating the oscillation enable signal according to whether the internal voltage reaches the reference level.

22. The method of claim 19, wherein the generating of the internal voltage includes:
generating a pulse signal in response to the oscillation enable signal; and
performing a pumping operation in response to the pulse signal to generate the internal voltage.

23. The method of claim 22, wherein the generating of the pulse signal includes generating the pulse signal which is toggled when the oscillation enable signal is enabled.

24. The method of claim 22, wherein the generating of the internal voltage includes pumping up the internal voltage to a target level when the pulse signal is generated.

25. The method of claim 19, further comprising:
between the generating of the oscillation enable signal and the generating of the internal voltage, selectively outputting any one of the fixed level detection signal, the variable level detection signal, or the oscillation enable signal to the generating of the internal voltage.

* * * * *